(12) United States Patent
Harald et al.

(10) Patent No.: US 6,466,925 B1
(45) Date of Patent: Oct. 15, 2002

(54) METHOD AND MEANS FOR SIMULATION OF COMMUNICATION SYSTEMS

(75) Inventors: Brandt Harald, Hägersten (SE); Haraszti Zsolt, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/467,624

(22) Filed: Dec. 20, 1999

(30) Foreign Application Priority Data

Dec. 22, 1998 (SE) ............................................... 9804513

(51) Int. Cl.⁷ ............................................... G06F 15/18
(52) U.S. Cl. .......................................... 706/16; 706/21
(58) Field of Search ...................... 706/16, 21

(56) References Cited

U.S. PATENT DOCUMENTS 5,377,307 A 12/1994 Hoskins et al. ............... 706/19
5,453,676 A * 9/1995 Agrotis et al. ............... 318/643

FOREIGN PATENT DOCUMENTS

EP 0 833 075 12/1998
JP 8-95950 4/1996

OTHER PUBLICATIONS

Heegaard, Poul E., *Speed–Up Techniques for Simulation*, Telektronikk 2–1995, pp. 1–29.

Heegaard, Poul E., *Rare Event Provoking Simulation Techniques*, International Teletraffic Seminar, 28 Nov. – 1 Dec. 1995, Bangkok, Thailand, pp. 1–12.

* cited by examiner

*Primary Examiner*—George B. Davis
(74) *Attorney, Agent, or Firm*—Jenkens & Gilchrist, P.C.

(57) ABSTRACT

A method and means for speeding up simulation in a communication system use Importance Sampling (IS) involving fitted stochastic processes that are artificially altered and fed to the system as inputs in order to shorten the time between so called rare events. The simulation needs to be compensated for the alteration so that the simulation remains unbiased. The problem of finding optimal alternations can be reduced to find optimal bias parameters for the stochastic processes. Here an Artificial Neural Network (ANN) together with a Statistical Bias Optimizer is used in a first phase where the ANN is trained with input parameters and their corresponding optimal output bias parameters. In an application phase, only the trained ANN is used to very quickly provide optimal output samples for the final simulation.

20 Claims, 2 Drawing Sheets

METHOD AND MEANS FOR SIMULATION OF COMMUNICATION SYSTEMS

TECHNICAL FIELD OF THE INVENTION

This invention relates to a method for simulation of communication systems and networks of such systems. The technique is based on the use of importance sampling and aims to speed up the process of simulating so called rare events.

DESCRIPTION OF RELATED ART

Simulation of communication systems and networks of such systems is an area of increasing importance. Simulation is normally used in order to find out the behavior and performance bottlenecks before product design, but also for real time network configurations and performance predictions to maintain, administer and optimize network resources. These simulations take a number of traffic sources of varying statistical models as input to the system. The aim is to analyze performance metrics of such systems in terms of e.g. time delays, delay variations, loss or corruption of data or probability to enter a certain state. The statistical nature of the traffic sources implies that the focus of such studies is in what a skilled person in the art would refer to as rare events. To capture such rare events with an acceptable confidence, however, requires very long simulation times unless the problem is transformed in some way.

Importance sampling is a known technique to speed up the simulations very much. In order to achieve that, it is necessary to "bias" the statistics of the traffic sources. To find optimal such biases, however, is a very time consuming process, taking longer time than the actual importance sampling itself. Although the net result is still much faster than ordinary simulation, the difficulty of importance sampling lies in obtaining good biases.

In the simulation of a communication system (or element), traffic sources and other random inputs of the system are modeled by properly chosen stochastic processes. Parameters of such stochastic processes are set so that the processes mimic the desired behaviour of the corresponding (real or assumed) traffic sources as close as possible. In conventional simulation the system model is executed with the fitted processes until sufficient amount of statistical data has been collected, enough to estimate performance parameters with the desired precision. The simulation time required to achieve that precision can, however, become prohibitively long when the estimated parameter involves some rare events.

In importance sampling (IS) simulation, the fitted stochastic processes are artificially altered such that the time between rare events can be substantially reduced. To compensate for the alteration of the inputs, proper statistical adjustments of the simulation outcomes are applied during and after the simulation in a way that the resulting estimates remain statistically correct (unbiased).

As of today, one of the crucial problems of IS remains, and that is how to alter the input processes to achieve sufficient speedup, thus reducing the simulation time from "prohibitively long" to "feasible". The simulation must not either be too short since the variance then becomes too big to properly reflect actual scenarios. There are several scientifically interesting approaches presented in the literature, but only a few of them can be considered general enough to be considered for practical implementation. The most promising approaches are based on so called parametric biasing, where a systematic alteration of all involved sources are performed according to some functions of very few (typically one or two) key parameters, also called bias parameters. In such an approach, finding the optimal alteration of the inputs is reduced to finding the optimal values of the bias parameters. The parametric biasing approach can be found in e.g. M. Devetsikiotis and J. K. Townsend, "Statistical Optimization of Dynamic Importance Sampling Parameters for Efficient Simulation of Communication Networks", IEEE/ACM Trans. Networking, Vol. 1, No. 3, pp. 293–305, June 1993. Another piece of prior art is to be found in Q. Wang and V. S. Frost, "Efficient Estimation of Cell Blocking Probability for ATM Systems", IEEE/ACM Trans. Networking, Vol. 1, No. 2, pp. 230–235, 1993.

To search for optimal bias parameters, a statistical optimization based on short repetitive simulations is suggested in M. Devetsikiotis article. Finally, when an optimal setting is found, a longer simulation with the optimally set importance sampling parameters is run to generate data for the final estimate in order to get the so called "target parameters", i.e. the wanted parameters of interest.

To obtain large speed-up factors in simulation run time using importance sampling, the modification or bias of underlying probability measures must be carefully chosen. Analytically or numerically minimizing the variance of the simulation result with respect to the biasing parameters or finding the optimal exponential change of measure is only possible under certain conditions. Optimization of the bias parameters requires today typically two orders of magnitude more simulation cycles than the final run (with the optimal parameters) to get the target estimates. Therefore, the great possibility of reducing the total time for a successful simulation lies in reducing the time spent in optimizing the bias parameters.

Today, no reliable and efficient solutions to that problem exist.

SUMMARY

The problem addressed in this invention is therefore not to find what bias parameters to be used, but rather how to find an effective bias scheme with optimal bias parameters in a much faster way than what is hitherto done and then use them in the final simulation. It could be described as a rapid way of mathematically trying to find the right alteration of the input parameters in order thereafter to perform an accurate and adequate simulation. These alterations should of course imply that the time between rare events is significantly reduced.

Slow simulation methods will in the end affect end users if not, as a result, the communication system is adequately tested in every aspect. When the customer runs the system in real time the parameters in system components must be predicted so to e.g. guarantee certain QoS for different types of traffic.

Some observations have been made which motivated the invention:

- Optimization of the bias parameters requires today typically two orders of magnitude more simulation cycles than the final run (with the optimal parameters) to get the target estimates.
- Importance sampling accepts a certain tolerance in the precision of the bias parameters i.e. the close neighbourhood of the optimal parameters serve practically almost as well as the optimal point itself.
- Due to the above tolerance, a bias point found optimal for a given input configuration, A, can be used as a quasi-optimal bias point for another input configuration, B, provided that A and B are "sufficiently similar". That is, knowing the optimal bias point for configuration A and knowing that configuration B is very similar to A, one can skip the optimization step, thus jumping directly to the target estimation.

The solution proposed according to the core of the invention relates to the method and means for simulation of a communication system using Importance sampling and employing an Artificial Neural Network (ANN) to speed up the process by "learning" the relationship between system configurations and their associated optimal bias points. When trained, such an ANN proves to be able to provide quasi-optimal biases for new configurations. Hence, the invention helps in the process of simulation by speeding up the first part of the simulation, i.e. the preparation of the optimal bias vector for a certain input parameter vector. That is, the trained ANN then "hints" the "final" IS simulator about the bias vectors to be used for given input parameter vectors.

An ordinary Statistical Bias Optimizer that is here used to train the ANN, has after the training completed its task and is subsequently redundant. The second part of the simulation, i.e. the final estimate of performance parameters in the IS simulator is not affected by the invention.

Consequently, as any well-configured and well-trained neural network would do, this neural network will provide a function approximation that is "smooth" in the sense that it generalizes to provide a good mapping also for input samples that it has not "seen" in the training set. Hence, when presented with an input sample that is not too far away from other samples in the training set, the ANN will output a bias parameter that is reasonably close to the bias parameter the Statistical Bias Optimizer would provide. The neural network however, once trained, can compute this bias vectors many orders of magnitude faster than the Statistical Bias Optimizer can achieve.

BRIEF DESCRIPTION OF THE DRAWINGS

The features of the invention believed to be novel are set forth with particularity in the appended claims. The invention itself however, both as to organization and method of operation, together with further objects and advantages thereof, may be best understood by reference to the following description with the accompanying drawings, in the several Figures in which:

DETAILED DESCRIPTION OF EMBODIMENTS

Figure 1:
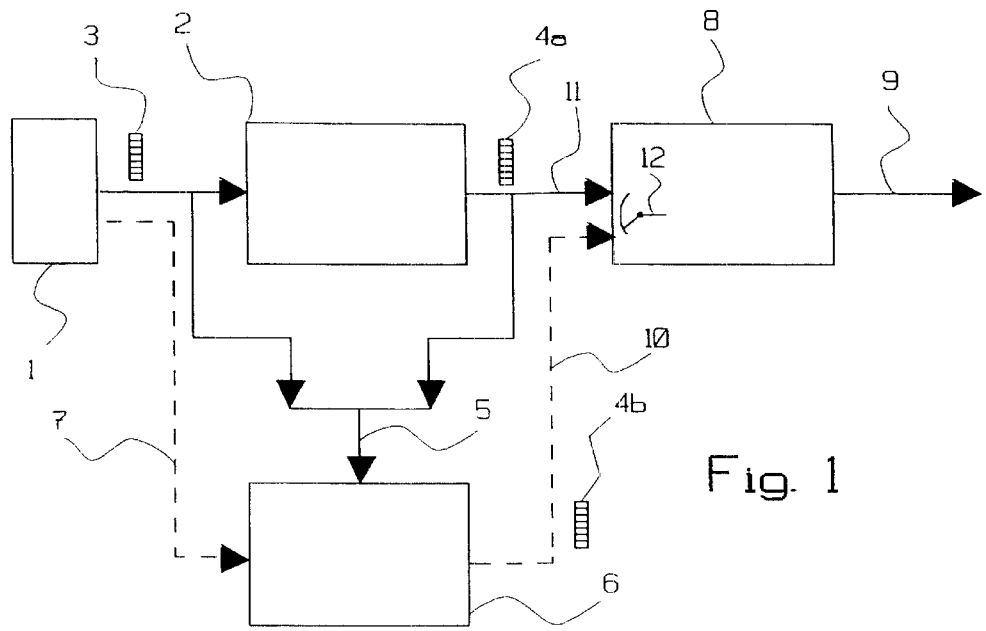
FIG. 1 shows a functional block diagram of a preferred embodiment of the invention.

FIG. 1 is a functional block diagram of a preferred embodiment of the invention. The characteristics of possible traffic sources of a system to be analyzed by simulation are described by a fixed number of aggregated statistical parameters collected in an input parameter vector. FIG. 1 illustrates both a training phase with solid lines and an application phase with dashed lines, and in FIG. 1 we see the input parameter vector coming from the left into the system, which functionality shall be further described.

According to a preferred embodiment of the invention, a large set of the above-mentioned input parameter vectors, also called input samples in Artificial Neural Network terminology, are generated by any kind of generating means 1, either systematically or randomly.

Optimal bias vectors corresponding to the input samples are calculated by performing a bias optimization in a Statistical Bias Optimizer 2. Bias Optimization is a well-known technique to persons skilled in the art. The Bias Optimizer is fed with the input samples. As an example, FIG. 1 depicts one input sample (or input parameter vector) 3. After processing in the Bias Optimizer 2, we obtain an optimal bias parameter vector 4$a$. The optimal vector 4$a$ could also be defined as an output sample. Pairs of input-output samples, forming elements of a training set 5, are fed to an Artificial Neural Network 6 (ANN) in a first so-called training phase. The flow of data in the training phase in FIG. 1 depicted with solid lines.

The ANN 6 is trained for a period of time by a plurality of training sets 5, which are fed to the ANN 6. The training aims at teaching the ANN 6 to do a best-fit function approximation from input to output samples by letting the ANN 6 see a large training set, and thereby a relation between the input parameter vectors and the corresponding optimal bias parameter vectors.

The ANN 6 will be able to recognize a large number of input configurations, however there can never be guaranteed that the ANN 6 will recognize 100% of all possible configurations. In any case, the ANN 6 will be able to recognize a satisfying and reasonable amount of different input configurations.

In the application phase, which follows the training phase, here symbolized with dashed lines 7 and 10, new input samples are presented to the ANN 6 via a link 7, and the ANN 6 provides an output sample 4$b$ via a link 10 as a "suggested" (quasi-) optimal bias vector for the given input configuration. The bias vector is then used in the final simulation where desired target parameter estimates are generated. A final IS-simulation is here illustrated with block 8 and the result obtained by the operation of the IS-simulation indicated with arrow 9 is hence the final estimate of the performance parameters.

Consequently, the above mentioned preferred embodiment employs an ANN which, after the training phase, functions in the application phase as a very fast provider of optimal bias vectors.

In the event that we are in the application phase using the ANN and a non-familiar input parameter configuration occurs, there will be a possibility to switch over to the training phase and let the Bias Optimizer 2 calculate the optimal bias value and feed it to the IS-simulator 8 via the link 11. This will only happen when the input configuration is of a kind far away from what the ANN has seen in the training set, and consequently not in the area the ANN has been trained to handle.

Such an odd input configuration can for example be the result of an upgrading of the equipment. Another possible reason would be that the traffic characteristics have developed to another mix than that present at the time of training the ANN. An option is then of course to re-train the ANN and use the ANN again.

A simple switch 12 in the IS-simulator block 8 could be used for switching between the application phase and the training phase and vice versa.

Figure 2:
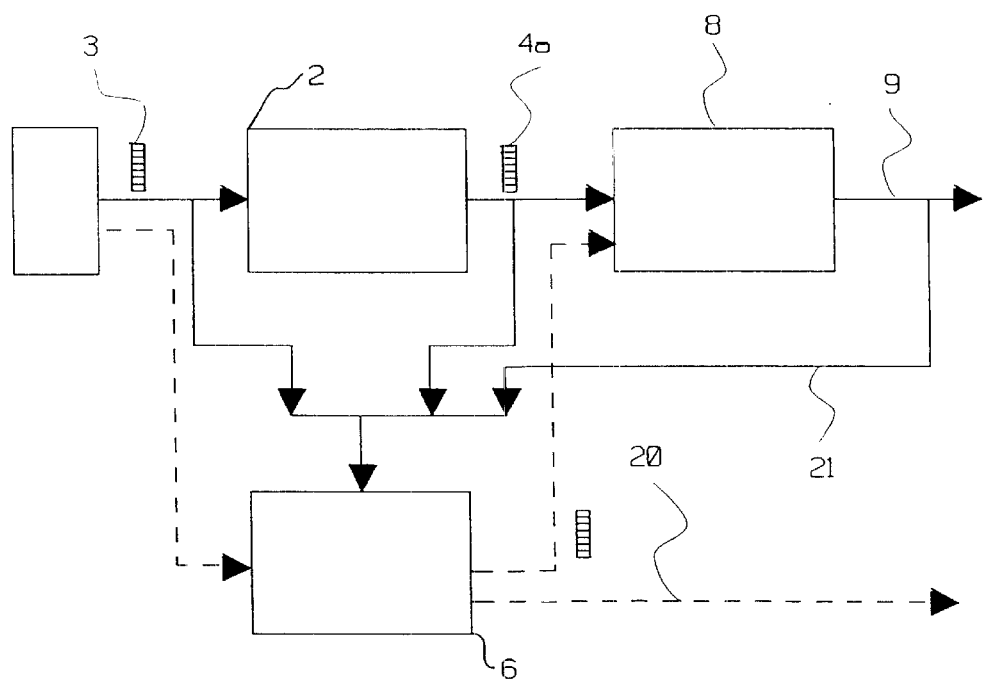
FIG. 2 shows a functional block diagram of the invention used in a wider scope and FIG. 3 shows a functional block of yet another embodiment where the invention may well be used.

The general technique referred to above is advantageously used in another embodiment where an option is to go even further and extend the use of the ANN. This embodiment as illustrated in FIG. 2 employs the ANN 6 for predicting both the biases and the performance metrics, and the function is here merely illustrated with an arrow 20 indicating an output from the ANN 6 estimate of performance parameters. Performance metrics could be e.g. delay, delay variations and packet loss (where a packet could be e.g. an ATM cell). An arrow 21 illustrates that, in the training phase, output samples 9 from the IS-simulator 8 are added to the training set, so that the training set consists of triplets of 3, 4a and 9. The ANN 6 could then be used for all traffic situations for which it has seen similar cases, so that the simulator only needs to be used for "new" situations.

Figure 3:
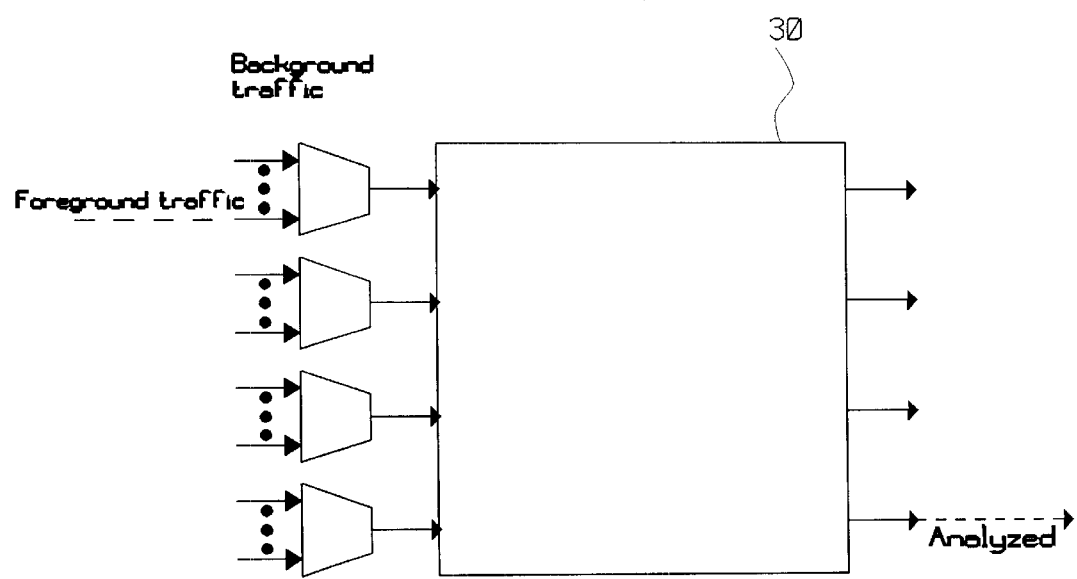

FIG. 3 illustrates an application in which the invention may well be used. In the application example illustrated in FIG. 3, we analyze the performance of foreground traffic as it passes through the switching device 30. The traffic is analyzed under the load of the "ever present" background traffic that is illustrated with all the other incoming arrows. Crucial properties of the performance are e.g. rare events of losses and delays.

First, a model of the system that can be understood by the simulator is developed. A number of traffic sources, having "realistic" statistical properties to be used as input to the simulator, are set up. These traffic sources are divided into background traffic sources and foreground traffic sources. Simulation is then carried out to estimate the performance of the foreground traffic under the network load of the background traffic as is illustrated in FIG. 3. Bias for the importance sampling is predicted for both the "foreground traffic" and the "background traffic" separately, and the neural network is trained as described above, i.e. according to the very core of the invention.

The structure of the ANN in all of above-mentioned embodiments can of course be of various kinds.

What is claimed is:

1. A method for speeding up simulation of a communication system using importance sampling (IS), said method comprising the steps of:
   generating input parameter vectors;
   calculating first optimal bias parameter vectors corresponding to said input parameter vectors using a statistical bias optimization procedure;
   training an Artificial Neural Network (ANN), in a training phase, by feeding said ANN a training set including said input parameter vectors and said first optimal bias parameter vectors; and
   wherein said training phase permits second optimal bias parameter vectors to be calculated at a greater speed than said first optimal bias parameter vectors were calculated.

2. The method of claim 1, further having an application phase used after said training phase, said application phase comprising the steps of:
   presenting new input parameter vectors directly to the trained ANN; and
   calculating, by the trained ANN, of said second optimal bias parameter vectors, said second optimal bias parameter vectors corresponding to said new input parameter vectors.

3. The method of claim 1, further having an application phase used after said training phase, said application phase comprising the steps of:
   presenting new input parameter vectors directly to the trained ANN; and
   in response to occurrence of at least one non-familiar input parameter vector of the new input parameter vectors:
   switching to the training phase; and
   calculating optimal bias parameter vectors corresponding to said new input parameter vectors.

4. The method of claim 2, further comprising the step of providing said second optimal bias parameter vectors to an importance sampling (IS) simulator to generate target parameter estimates corresponding to said new input parameters.

5. The method of claim 2, further comprising the step of providing an estimate of a performance parameter from said ANN.

6. The method of claim 5, wherein said estimate of a performance parameter is selected from the group consisting of a delay parameter, a delay variation parameter, and a packet loss parameter.

7. The method of claim 1, wherein said training set teaches said ANN to perform a best-fit approximation of the relationship between said input parameter vectors and said corresponding optimal bias parameter vectors.

8. The method of claim 1, wherein said training set comprises target parameter estimates from an importance sampling (IS) simulator.

9. The method of claim 1, wherein said input parameter vectors comprise statistical parameters related to at least one traffic source model.

10. The method of claim 1, wherein the simulation relates to simulation of rare events.

11. An apparatus for speeding up simulation of a communication system using importance sampling (IS), said apparatus comprising:
    a generator for generating input parameter vectors;
    a statistical bias optimizer, connected to said generator, for receiving said input parameter vectors and generating corresponding optimal bias parameter vectors;
    an importance sampling (IS) simulator, connected to said statistical bias optimizer, for receiving the optimal bias parameter vectors and generating target parameter estimates; and
    an Artificial Neural Network (ANN) connected to said generator and to said statistical bias optimizer, said Artificial Neural Network (ANN) being adapted to receive said input parameter vectors from said generator and said corresponding optimal bias parameter vectors from said statistical bias optimizer during a training phase;
    wherein said trained ANN is adapted to generate new optimal bias parameter vectors at a greater speed than said statistical bias optimizer generates said optimal bias parameter vectors.

12. The apparatus of claim 11, wherein, during an application phase after the training phase, new input parameter vectors are provided to said ANN via a connection from said generator directly to said ANN, said ANN generating new optimal bias parameters corresponding to the new input parameter vectors and providing said new optimal bias parameters via a connection to said importance sampling simulator.

13. The apparatus of claim 12, said apparatus further comprising:
    a switching unit, associated with said importance sampling simulator, for switching between said training phase and said application phase.

14. The apparatus of claim 13, wherein said switching unit switches from said application phase to said training phase in the event of a non-familiar input parameter vector.

15. The apparatus of claim 11, wherein said target parameter estimates from said importance sampling simulator are provided to said Artificial Neural Network (ANN) during said training phase.

16. The apparatus of claim 11, wherein said Artificial Neural Network (ANN) further provides an estimate of a performance parameter.

17. The apparatus of claim 16, wherein said estimate of a performance parameter is selected from the group consisting of a delay parameter, a delay variation parameter, and a packet loss parameter.

18. The apparatus of claim 11, wherein said Artificial Neural Network (ANN) performs a best-fit approximation of the relationship between said input parameter vectors and said corresponding optimal bias parameter vectors.

19. The apparatus of claim 11, wherein the simulation relates to estimating the performance of at least one foreground traffic source through a switching device under the load of at least one background traffic source.

20. The apparatus of claim 11, wherein said input parameter vectors comprise statistical parameters related to at least one traffic source model.

* * * * *